US008311893B2

(12) United States Patent
Schoettle

(10) Patent No.: US 8,311,893 B2
(45) Date of Patent: Nov. 13, 2012

(54) SYSTEM AND METHOD FOR PROVIDING INFORMATION ON SELECTED TOPICS TO INTERESTED USERS

(76) Inventor: Roland Schoettle, Freeport GBI (BS)

( * ) Notice: Subject to any disclaimer, the term of this patent is extended or adjusted under 35 U.S.C. 154(b) by 101 days.

(21) Appl. No.: 12/488,320

(22) Filed: Jun. 19, 2009

(65) Prior Publication Data

US 2010/0325004 A1    Dec. 23, 2010

(51) Int. Cl.
*G06Q 30/00* (2006.01)
(52) U.S. Cl. .................................. 705/26.1; 705/26.3
(58) Field of Classification Search ................ 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 6,012,051 A * | 1/2000 | Sammon et al. ................ 706/52 |
| 6,321,221 B1 * | 11/2001 | Bieganski .................... 705/26.7 |
| 6,334,127 B1 * | 12/2001 | Bieganski et al. ..................... 1/1 |
| 6,412,012 B1 * | 6/2002 | Bieganski et al. ............. 709/232 |
| 6,473,739 B1 * | 10/2002 | Showghi et al. ................ 705/15 |
| 7,047,426 B1 * | 5/2006 | Andrews et al. .............. 713/155 |
| 7,289,967 B1 | 10/2007 | Brader-Araje et al. |
| 7,395,316 B2 * | 7/2008 | Ostertag et al. ............... 709/207 |
| 7,523,132 B2 * | 4/2009 | Altounian et al. ..................... 1/1 |
| 7,831,504 B1 * | 11/2010 | Cleaves et al. ................. 705/37 |
| 7,859,550 B2 * | 12/2010 | Altounian et al. ........... 345/619 |
| 7,953,673 B2 * | 5/2011 | Augusto et al. ............... 705/319 |
| 2003/0036964 A1 | 2/2003 | Boyden et al. |
| 2003/0088520 A1 | 5/2003 | Bohrer et al. |
| 2004/0215526 A1 | 10/2004 | Luo et al. |
| 2005/0004880 A1 * | 1/2005 | Musgrove et al. ............ 705/400 |
| 2005/0203807 A1 | 9/2005 | Bezos et al. |
| 2005/0289039 A1 | 12/2005 | Greak |
| 2006/0031114 A1 * | 2/2006 | Zommers ........................ 705/10 |

(Continued)

FOREIGN PATENT DOCUMENTS

WO   WO-2008/042817    4/2008
WO   WO-2008/154648   12/2008

OTHER PUBLICATIONS

Estelami, Hooman "Consumer use of the price-quality cue in financial services", Journal of Product & Brand Management, 2008, v17n3 pp. 197-208. Retrieved from Dialog File 15, Acc#: 05611104 on Jul. 3, 2012.*

(Continued)

*Primary Examiner* — Naeem Haq
(74) *Attorney, Agent, or Firm* — Fulbright & Jaworski L.L.P.

(57) ABSTRACT

There are disclosed systems and methods which provide for an inter-action between unrelated databases such that information provided to a first database by a first provider can be pushed from the first database to a user based, at least in part, on data provided by that user to a second database unrelated to the first database. This then allows a user to have information pushed to him/her based upon information previously obtained from that user or about that user. In one embodiment, the user enters his/her information into one or more databases and the entered information forms the basis for information to be pushed to that user from any database even if the pushed information resides in a non-related database. In another embodiment, the data required from a provider is determined based upon data gathered from other providers for similar items. In some situations certain data is gathered without active participation from the provider.

14 Claims, 6 Drawing Sheets

U.S. PATENT DOCUMENTS

| | | | |
|---|---|---|---|
| 2006/0064409 A1* | 3/2006 | Hardwick | 707/3 |
| 2006/0253380 A1* | 11/2006 | Adcock et al. | 705/37 |
| 2007/0124228 A1* | 5/2007 | Elias et al. | 705/37 |
| 2007/0174140 A1* | 7/2007 | Noonan et al. | 705/27 |
| 2007/0174188 A1 | 7/2007 | Fish | |
| 2008/0065504 A1 | 3/2008 | Newmark et al. | |
| 2008/0071829 A1 | 3/2008 | Monsarrat | |
| 2008/0103877 A1* | 5/2008 | Gerken | 705/10 |
| 2009/0013376 A1* | 1/2009 | Iwasaki et al. | 726/1 |
| 2010/0057690 A1 | 3/2010 | Chu et al. | |

OTHER PUBLICATIONS

Grzymala-Busse, Jerzy W. "Three Approaches to Missing Attribute Values: A Rough Set Perspective", Studies in Computational Intelligence (SCI) 118, 139-152 (2008), © Springer-Verlag Berlin Heidelberg 2008.*

International Search Report and the Written Opinion issued for PCT/CA2010/000936, dated Oct. 6, 2010, 12 pages.

* cited by examiner

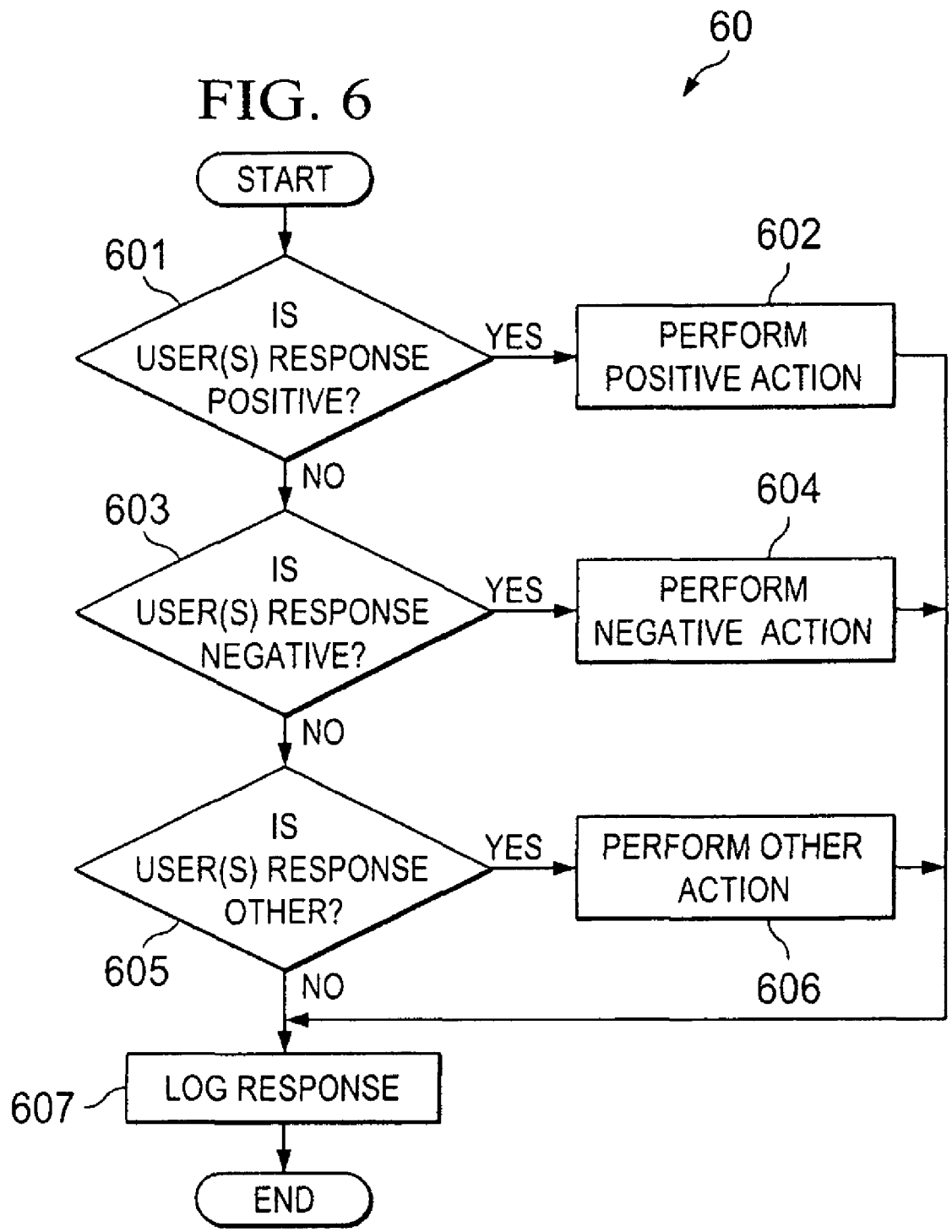

SYSTEM AND METHOD FOR PROVIDING INFORMATION ON SELECTED TOPICS TO INTERESTED USERS

CROSS-REFERENCE TO RELATED APPLICATIONS

This application is related to concurrently filed, co-pending, commonly owned patent application SYSTEM AND METHOD FOR AUTOMATICALLY RESTRUCTURING DATABASE ENTRIES BASED ON DATA OBTAINED AMONG A PLURALITY OF USERS, U.S. patent application Ser. No. 12/488,336, which application is hereby incorporated by reference herein.

TECHNICAL FIELD

This disclosure is directed to social networking and more particularly to a system and method for pushing information on selected topics to interested users.

BACKGROUND OF THE INVENTION

It has now become common place for individuals and businesses to list items they want to sell (or information they want others to have) in a database accessible to users. Some of the databases contain consumer goods and services, such as cars, books, maps, electronics, medicine, job listings, newspapers, etc. Other databases contain information, such as definitions, specifications, names and addresses and the like. These databases are organized, usually by a sponsor, so that anyone of the general public can access the database and enter keywords or otherwise search for a desired item or piece of information. Other databases require some form of pre-membership, either for a cost or free, where passwords or other security devices limit access to only those with an affinity to a particular database.

One thing these databases have in common is that they are separate entities that do not know or otherwise "understand" other databases that may (or may not) contain the same or similar items. Typically, a user attempting to obtain information must affirmatively access a database to retrieve the information. This operation is called "pulling" the information from the database. A fundamental operating parameter for pulling-type systems is that the user must: a) manually perform a search of a select database (or set of databases) every time a search is requested; b) sort through the information returned from every request—often performing further sub-searches based on unique descriptors; c) find the stored data in the place searched; and, d) if successful; then e) then access the data. This operation is repeated using other known databases until the correct information is pulled or until the user gives up. This operation is especially frustrating for users who search unsuccessfully but must find the proper information, or for those users that search regularly but are often unsuccessful (and therefore must repeat the search process until successful). This requires the user to spend time searching and thus is not practical for many applications and especially not useful when the user is otherwise occupied.

Search engines attempt to search all "net" connected databases, but typically fail due to numerous reasons, including: a) items may be coded into the database in such a manner as to make it difficult for search engines to navigate; b) items may be too deep within the database hierarchy; c) items in the database may not have sufficient descriptors to be caught by the search engine; and d) the search engine user may be using an unfamiliar or incorrect descriptor vs. the descriptor(s) used by the database originator and/or search engine.

A further drawback that exists with present systems is that they are primarily stand-alone and thus the data from one database or source does not easily integrate with data from another source.

Other problems exist when a user is attempting to input data. Any such inputted data is treated as an independent event. Thus, when a user inputs data pertaining to a specific item the user must either fill out fields in a preexisting form or must independently decide what information to include. Again, this is time consuming and in some situations leads to less than all of the desired (descriptive) information being supplied or supplied in a manner which promotes inefficient use of the material.

BRIEF SUMMARY OF THE INVENTION

There are disclosed systems and methods which provide for an inter-action between unrelated databases such that information provided to a first database by a first provider can be pushed from the first database to a user based, at least in part, on data provided by that user to a second database unrelated to the first database. This then allows a user to have information pushed to him/her based upon information previously obtained from that user or about that user. In one embodiment, the user enters his/her information into one or more databases and the entered information forms the basis for information to be pushed to that user from any database even if the pushed information resides in a non-related database. In another embodiment, the data required from a provider is determined based upon data gathered from other providers for similar items. In some situations certain data is gathered without active participation from the provider.

One advantage of the system and methods of this invention is that users in diverse locations and using diverse devices have instant common access across multiple databases where all items are fully described using common (normal) descriptors. This then allows multiple databases anywhere in the world to appear and operate as though they were a unified database. This database or these databases could be created so that they operate on the same basic format or universal database structure which would allow seamless operation through all information.

In one embodiment, the system creates an "inventory" of users' "haves", "wants" and, if desired, "don't wants" that can be used to create user communities. The "inventory" can include any number of different items across all lines of commerce (e.g., products, services, information) along with the attributes of the item and the profiles of the users.

In one aspect, the system operates to form user communities which have items, actions, or attributes in common based on processor control or on the fact that the users have given permission to be included in or otherwise form a community or association. In such situations, the user need take no affirmative action to join the community. For example, assume a user provides global permission to be involved in the system using the concepts discussed herein. Also assume the user (User A) owns (or wants information on) a watch. Information (attributes) pertaining to the watch and linking the attributes and the watch to the user is sent to the system. This information can come directly from the user or could come from the point of sale or from a warranty registration or from any of several sources. New attributes not included in the original information can be requested at any time by any user (within the community), including new users with interest in the same brand and/or type of watch. For any new attribute (not originally included) the system automatically and in real-time pushes a request to all previous users of similar watches (that already are in the system) so as to update their particular information/profile with the new attributes. The system could also determine missing attributes from other items in a database, from other users, or the system could fill in a missing attribute by itself.

For example: assume User A and User B are owners of a watch, whereas User X is interested in a Color blue Brand M watch made in 2005, neither of which color, brand, or manufacture date were attributes included when User A and User B input their watch information to the system. However, as soon as User X inputs the new attributes requesting "blue", "brand", and manufactured in "2005", the system immediately sends ("pushes") a request to all other Users owning or in any way interested in the same/similar watch as to the new attributes "color" and "manufacture date" (including User A and User B). This same approach can be used for any attribute and for any product thereby creating a self-learning system for any attribute and any product. Attributes can include most anything, including (but not limited to), owner, level of want, level of need, level of interest, cost to replace, amortizations, price to acquire (buy), price to dispose (sell), location, preferences, model, costs, color, size, mass, material, number of components, component types, technology used, product manuals, service manuals, manufacture date, warranty information, run times, intended use, time between failure, expected life, maintenance schedule, any part of a user profile, etc. Transactions can themselves be attributes and attributes can themselves include any number of attributes or sub-attributes or actions. For example: there can be an action attribute called "for sale" which can have the entries "yes", "no", or have a preset "reserve". "Reserve" prices can be automatic, manual, or suggested by the system and/or by the user. Multiple users that meet the reserve can automatically start an auction.

For attributes already known to the system, the system asks to have those attributes included in the original user input. Users however are not required to enter all known attributes, but only those they feel necessary for their own interests. The system can keep track of the status of all attributes, including those not immediately entered into the system or alternatively learn them again for any old or new information entered into the system using the approach highlighted above. It should be obvious that the importance of the information (items and attributes) can change over time and that importance is itself an attribute of the link between the user and the item. For example, a user that is interested in watch Brand M but that cannot otherwise afford this item, may rank the importance of ownership much higher after cashing in their stock options. Such user may also decide that their previously empty attribute for color must now be "blue" and that the watch band be "rubber" (thereby initiating a new system-wide push for the new attribute "watch band"). The reverse may also prove true: a user that has fallen on hard times but that previously did not have the time or inclination to include known or new attributes, can do so at anytime to encourage other users to consider their item for purchase.

A different example that highlights the attribute "importance" is given: Assume User A has an old car and that the maintenance schedule calls for a water pump change at some recommended mileage. When the user inventoried the item (car) into the system, he may or may not have put the maintenance attribute for the water pump into the system. If he did, it could have been much earlier when the water pump change priority was very low. He likely didn't however. The mileage of the car is now approaching the recommended water pump change mileage. User A assumes however, that there is some "cushion" in the recommended mileage and takes the car on a long drive far from home and into unknown territory when the water pump fails. User A then uses his cellular phone or some other handy devices to input (if the attribute is new as supposed) or change the water pump maintenance or importance attribute to "critical/fail" or some other equally descriptive attribute if it already exists, an action that causes the system to instantly use the cell-phone GPS co-ordinates of User A to automatically and instantly ask other users in the region that have the same car if they know anything about assisting with the water pump problem? The system can be set to first check local individuals before checking with local businesses (e.g., repair or parts shops) or community/associated networks or in any order desirable. The system continues to expand the local region until User A is satisfied with the response from other users, thereby instantly creating a new community/association of like-minded users if desired. The interaction can then be set by the system to be most convenient to the user (e.g., by voice using the phone, by SMS, or by any other method available to the user). All of this is performed instantly creating the world's first "instant assistant" for virtually any challenge, including security, medical, fitness, and so on.

In one embodiment, a first user would inventory whatever information about a product or service and a second user would enter information about the same product or service but might include an additional attribute. The system then can poll all prior users to obtain the additional attribute.

In another embodiment, the system itself defines an item attribute basics list so that hackers/competitors cannot add useless attributes or remove useful attributes.

In another embodiment, a user would also inventory their food preferences (e.g., vegetarian, loves mushroom soup, loves pear and gorgonzola pizza). The system could access the GPS information from the user's cellular telephone. In this manner, the system would know the food preference, the user's location, and the time so that other users of the system, say restaurants that serve vegetarian cuisine can send information relevant to the user, to say what is for lunch. Although unnecessary, in another embodiment the system could provide discounts for users that purchase food sourced via the system.

In another embodiment, a user would also provide and elicit instant recommendations or other feedback (e.g., ranking, voting, polling) to other users so as to add useful information to the user, community, association or inventory.

In another embodiment, a user would also inventory their professional qualifications, likes and dislikes (e.g., education, work experience, and so forth) so that employers using the system can use the system for self-screening and individuals seeking employment are instantly connected with interested employers.

In another embodiment, a user would also inventory their medical details (e.g., medical history, eyeglass prescription, allergies, etc.)

In another embodiment, a user would also inventory their personal qualifications, likes and dislikes (e.g., romantic preferences, etc.)

In another embodiment, a user would also be able to make any of their own data visible/invisible and/or usable/unusable to any user or set of users (e.g., regional users), for example setting a localized threshold price/cost so as to elicit a transaction on items not otherwise set for transactions.

In another embodiment, a user would also be able to be part of an "aggregation system" where any consumer can become part of a "user community" or an "association of buyers and/or sellers". The system could "pull" people into becoming part of a community or association to actively request interaction within the community and/or "push" (encourage) users, albeit for the user's own best interest, into being a part of the community or association.

In another embodiment, the system would also be able to summarize and link personal, environmental, societal, professional and/or business accomplishments for each individual, business, community and association as well as all related colleagues. For example, job seekers can perform reverse checks on prospective managers as well as the company they are thinking of working for (as well as the company's competitors, both established and start-ups).

In another embodiment, the system would also be able to automatically search all key "link-data" (structured databases) to promote the fastest possible organic growth.

In another embodiment, the system would also encourage anyone to proactively become an "expert" via their real usefulness (not just talk) as ranked by others in the community or association (and encourages more opportunities). References to all people, products, services and information therefore becomes "trusted" and "timely" as both are measured and tracked. This also encourages people to improve all profiling.

In another embodiment, the system would also focus heavily on scaleable local reach and local demographics while never limiting a worldwide reach.

In another embodiment, the system would also encourage people to register all of their products/services, interests, skill-sets, friends and colleagues. It could include features that allow for the easy classification and attachment of brochures, user manuals, service manuals, recipes, etc.

In another embodiment, the system would also allow a cell phone with camera to be a used as a barcode scanner for any and all items to be input into the system.

In another embodiment, the system would also track items for the purpose of life cycle/preventive management (maintenance, time and cost allocation/planning). E.g., when is it likely the water heater will need replacement and how far in advance should the replacement heater be budgeted so as to be easily affordable instead of purchased under extreme duress—automatically reminds the user that his/her vehicle needs service.)

In another embodiment, the system would also include the ability to add attachments (e.g., time-stamped and/or geo-tagged images of any item).

In another embodiment, the system would also include the ability to rank 1) any information so as to encourage continual improvement by its users, and 2) buyers and sellers so as to encourage honest interaction.

In another embodiment, the system would also run on any network connected device, where any data is seamlessly and securely usable from any device, on-demand and on the fly, anywhere the user is or may be based on a known schedule, such as obtained from an appointment calendar or from learned or repeated actions of the user.

In another embodiment, the system would also include the ability for users to chat, via text, IM, VoIP, and video to have face-to-face meetings to expedite rapport between parties.

In another embodiment, the system would also include the ability to gather data from other sites for its own purposes.

In another embodiment, the system would also include a framework for internet "home" pages for any entity, whether it be a person, a company, a product, a service, or on any topic.

In another embodiment, the system would also provide a notification system for setting and sending reminders and alerts to cell phones and other devices, including by: phone, text message (SMS), e-mail, instant message, fax. Notifications can include: specials-of-the day, meetings, wake-up calls, stock alerts, weather alerts, etc. using a VOIP back-end, but with a relevant advertisement as part of the message.

In another embodiment, the system would provide safety-related notifications to help users get out of potentially dangerous situations. E.g., the system would check time, date, and GPS location and compare this with crime statistics to determine dangerous areas (e.g., a park after dark where people run for added physical fitness). The system could be set, for example to 1) call the police if the person doesn't move for a preset period of time, 2) create an instant "community" of other runners in the park so that they can run together, 3) send text and voice messages to alert users of, for instance, upcoming "bad" areas. In another embodiment, the system would include the ability to instantly and automatically call and/or send a message (e.g., notify to a friend or neighbor) as soon as a user enters (on foot, or in a vehicle) a potentially dangerous area.

In another embodiment, the system would use the information gathered to perform data mining to forecast trends over time based on users, items, actions, attributes, or user communities. For example, this could be used to suggest items for sale to a user, to send advertisements or coupons to a user, to query a user about joining a user community, to order more stock from a warehouse based on sales, or a number of other activities. In another example, user communities could be grouped or created in order to find changes in attributes, actions, or users over time. In another example, users could gamble on future trends, or users could invest or speculate on what the trends will do in the future. In another example, users could create polls for other users, or voting could be performed by users or user communities.

In another embodiment, the system would automatically remove any attributes that are not useful based on trends. This can be done using a variety of approaches based on any number of trends over time such as inactivity, low user interest, or low user actions for an item. Note that: there are in fact many possible conditions, not just the ones discussed herein. The system could create "negative" value attributes learned from itself and/or reference external sources of negative-value attributes to build a "negative list" of detrimental information attributes that can be applied to inventory items. It should also be noted that any item can simultaneously have positive, zero and negative value attributes and that each of these can be ranked (thereby giving each attribute numerous possible rankings. The rankings can themselves be for various purposes, including for each user wanting to buy, each user wanting to sell, cultural, moral, environmental, ethical, financial, religious, as well as rankings for the usefulness and security to the system. This makes it much easier to slice and dice the data to determine value for trends, including the value for the number of trends (inactivity, low interest, low interest vs. high value, low interactions, low interactions vs. high price) and so forth. These lists (and their opposites) can also be part of other lists, cross-referenced and/or linked to other lists, or be lists unto themselves. The system could create zero value attributes learned from itself and/or reference external sources of zero-value attributes to build a "null-list" of zero value attributes that add no intrinsic informational value to an item. The system can create non-zero-value attributes (either determined from itself or from external sources) to build a "positive list" of valuable informational attributes that can be applied to other inventory items. These lists, including positive, negative and null-lists could be used for a multitude of purposes, including to make it difficult for hackers to add useless items/attributes or to remove items/attributes of value by having the lists define the items/attributes wanted or needed by the users.

In another embodiment, the system would provide location/time tracking services. This could be for numerous purposes including allowing parents to track the time and whereabouts of their children.

In another embodiment, the system would perform surveillance/neighborhood watch functions. For example, a user could input a date, time and location of suspicious activity, or a user could look at the locations of other users in an area.

In another embodiment, the system would perform time and distance and/or topology (e.g., elevation covered, amount of work done) tracking for the purpose of comparison of physical fitness regimes/styles and results with other users.

In another embodiment, the system would also generate very targeted advertisements depending on the time, keywords in the event, and geo-location on the call (knowing where someone is or needs to be, the context of what they'll be doing, and being able to reach them at an appropriate time with an opt-in call, e.g., "It's 6 AM . . . time to get moving for your 9 AM Meeting with Jim. For a quick pick me up, drop by the Home Juice on 22nd and 5th for a Big-One." And/or "It's almost lunch and the vegetarian cafe within walking distance is having a special on your favorite mushroom soup." The system would select an advertisement based on items, attributes and actions for a user or a user community.

In another embodiment, the system would also generate daily advertisement business from businesses based on user preferences. Special days like birthdays/anniversaries/etc. could include business from the likes of online flower, cookie, cake companies, etc.

In another embodiment, the system would also provide relevant plug-ins/APIs for digital datebooks, online calendars, etc.

In another embodiment, the system would also provide a full-featured API so as to encourage additional software development via any authorized third party which would further the "mash-up" of new offerings like add-on applications, widgets, etc., via an "apps" store. The system would integrate automatically with common email, calendar, and PIM clients (e.g., Microsoft Outlook, Apple's Mail and iCal, Google mail, etc.), and/or any other system that can be extended so as to keep track of an individual's time and CRM functions, should they wish to do so.

In another embodiment, the system would also use an open, XML-compliance-based infrastructure (e.g., DocBook, SGML, EbXML) that enables the global use of electronic information, especially business information, in an interoperable, secure, and consistent manner by any and all partners and users.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 shows one embodiment of a flow chart of the response and decision subsystem.

DETAILED DESCRIPTION OF THE INVENTION

Figure 1:
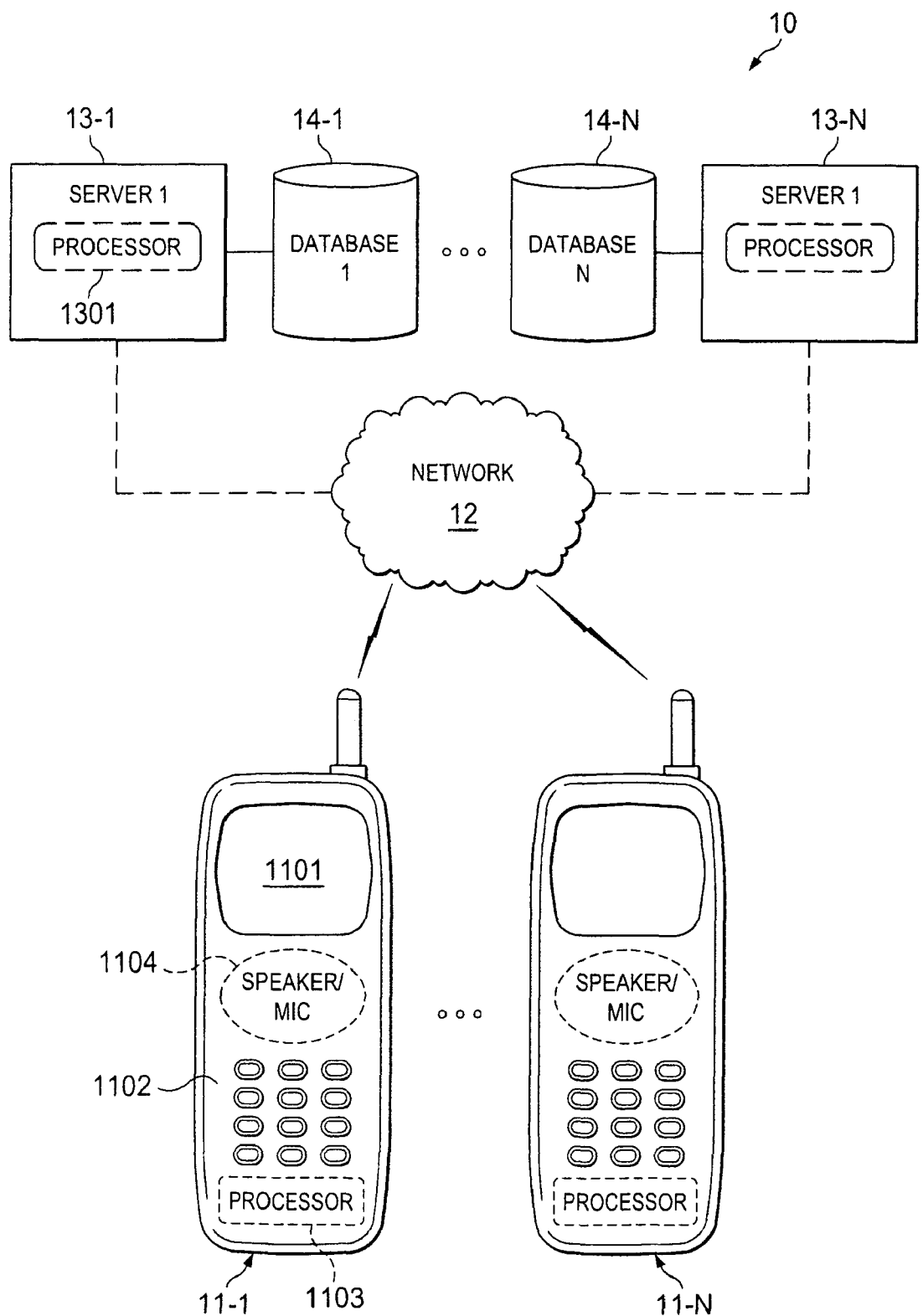
FIG. 1 shows one embodiment of a system including the concepts of the present invention.

FIG. 1 shows one embodiment 10 of a system including the concepts of the present invention. In this embodiment, users interface with the system using cell phone devices 11-1 to 11-N, but any type of device having communication capability can be used. The communication is preferably wireless using the traditional telephone voice network but the voice network can be combined with the signaling network or with a data network either in combination or any one of which can be used by itself. In addition, each communication can use the type of network available at the time of usage, or most suitable of the type of communication from time to time. Note also that some communications can be to devices that are not traditionally thought of as communication devices but which have communication capability. An example of this would be an oven, or a car, in which information is made available to and/or from the device from time to time or a household device such as a refrigerator.

As will be detailed hereinafter, users at devices 11-1 to 11-N communicate with one or more servers 13-1 to 13-N via one or more networks 12. The networks can be traditional telecommunication networks, cellular networks, or any wired or wireless networks, the Internet or a combination thereof. The servers are controlled by one or more processors 1301 which interface with one or more databases 14-1 to 14-N. The databases can be internal to the server or external thereto and can be at the same physical location or different physical locations. In some situations, the databases that are accessed from a first server are actually part of another server and can be local or remote to any server.

In operation, a user at a device, such as device 11-1, can input data via one or more inputs, such as keypad 1102 and can view information on display 1101 all of which is controlled by processor 1103. As will be seen, in some situations information is "pushed" to device 11-1 from one or more servers and can appear to the user as a full display of information or as a query, such as, "Does your Brand M watch have gold band?" The query, of course, could be fashioned as a check-off box, such that the statement that the user sees would say, "Is your Brand M watch, model 35X or model 42X? Please check the proper box." The user would answer the question using 1101, 1102, 1103 or 1104 to illicit their response. The query could also offer the user a menu of choices for response such as selling price, offering price, bid price, reserve price, or instant sale price. These messages to the user (or to other entities) are unsolicited (pushed) messages even though the user may have subscribed to the system.

Assume that the user is logged on to the system. In the context of this disclosure, logged on is the process of becoming active in the system and methods of this invention. Active status, as will be seen, allows information from a plurality of sources to be delivered to the user from time to time, with the delivery being based, at least in part, on some information the user has supplied, is currently supplying, or may supply to the system. This logon can be for a period of time, or could be permanent any time the user's device is active. Log-on could occur in the traditional manner by having the user access a server and enter an ID and a password, or logon could occur by the user simply activating a preferred device. The system, then seeing the active device, pushes a message to the user in the form of, "We note you are now active on the network." Although the user could set the default to automatically logon whenever their device becomes active, the user may prefer to have the system ask to "Please check 'yes' if you wish to become an active part of the system." Note that it is likely the user can log-on to become part of a user community and it is entirely possible that a user could also log-on for personal reasons only, e.g., log-on is only to update their personal detail or inventory. The user can log-in to do something singular that leads to plurality (community/associations) or vice versa. E.g., information that may only be of interest to the single user such as "when should my water pump be changed according to the manufacturer's warranty" is only interesting to the single user to start, but may illicit a community action by the system at some later time. The pushed message could have asked for a password, or other ID, such as a spoken word which could then trigger voice recognition.

Once active in the system, information, offers, help, etc. will be pushed to the user of the active device when appropriate. The question of appropriate is determined based on many factors, one of which is information obtained from the user or about the user, another of which is information relating to inventory. The information can come from the user, from a third party or from interactions and events happening with respect to the user at a particular time and/or place.

For example, if User A were to buy a new item, such as an oven, the user could scan the bar code of the oven (or take a picture of the bar code or other identification of the item) and the oven information would be uploaded to a sever and then stored in one or more databases in association with User A based on the device from which the information was received (or based on some other identification of the buying user.) The server could then go to the manufacturer's site, or to some other site that has information on that particular type (e.g., manufacturer, model, year, etc.) or particular oven and store that information in association with the user. Note that instead of actually storing the "other" information, the database could just keep links to a common database where the information can be stored.

Sometime in the future, some other User B in the system has problems with his/her oven and the information pertaining to the trouble condition is sent to a database in association with User B. Thus, over a period of time the system has stored a lot of user information pertaining to that type of oven. That user information can be gathered (either by every database sending the information to a clearing house, or by a clearing house pulling the information when it desires to do a cross check (e.g., to ensure data normalization to eliminate data redundancy). The data could also be normalized for multiple languages using cross-reference language look-up tables. This would allow a person or community in one language to be active with individuals and communities in other languages without significant effort—they would not need to know or care if they were across the street or across the world. At some point in time, a central facility determines that a particular issue or problem with this oven has reached a statistically meaningful level. When that occurs, the problem, and perhaps a suggested solution is pushed to all users of the system who have registered that particular oven make and model. The system could automatically trigger a question to all users who have not entered the make and model of their oven as to whether theirs is an Oven XYZ (again, with a simple yes or no) thereby registering this information. If there is a photo/image of Oven XYZ in the system for any reason (e.g., someone includes a brochure or picture of their oven with their inventory of the oven), then the system would send the image to make it easier to confirm the make and model (e.g., for Ovens with no make and model the system could ask "Does your oven look like this?") If "no," the system could continue showing/asking about other ovens or the user could abort. Together with the notice of the problem, each user could be provided a display message that says, "You have been notified of a problem with Oven XYZ. You will need certain parts in order to fix the oven. Check here (or say yes) to order the parts. Note that if there is a choice of parts suppliers, the system would display a list with costs. The cost will be ZZZ and this will be charged to your account." If service is required, the message could say, "Your oven XYZ needs service. Say 'yes' to set up a service call. The system could, if desired, provide choices of service people, perhaps using feedback from user community members. If there is more than one supplier, the system could allow automatic bidding or auctions between them from which the user can then choose. The user may enter a time and day when you would prefer the service to occur." When the user answers in the affirmative, the service is scheduled, perhaps using feedback from a community member, and the user(s) is notified.

This same scenario will occur for other functional aspects of the invention. For example, if a user wishes to buy a Brand Z watch with a gold band and black numbers that is no more than five years old, that information is transmitted to the system via a server. Then the system will determine all users who own watches fitting the description and push unsolicited action oriented messages to them all informing them of the desire for someone to buy such a watch and asking each potential seller if he/she wants to sell their Brand Z watch. These action oriented messages could be sent to the users on their respective mobile devices. The system would also go back and check all watches that did not have a brand, band and/or color for numbers and/or age, listed in their description. This would again be done via a simple user interface. Those that did meet the criteria would now be included in the buyer's request. No user is required to respond, but those that don't would not be part of the buyer's request. Since the message only goes to those users who have watches that fit the description of what the potential buyer wants, the first to say yes is deemed the seller. The buyer could choose to a) wait for more sellers, b) buy from any one of the sellers (not just the first one), c) begin an auction, or d) wait for more sellers with a forced ending time (a type of reverse auction). The buyer and seller then can be put in touch to complete the sale.

The attributes of the items of concern/enthusiasm can be broken down further (although they don't need to be) into items already owned, items wanted, items of interest, and so on. This will normally be done by the users themselves (and can be vetted by the users themselves as to redundancy, applicability, and so on—e.g., similar to users of Wikipedia vetting its contents).

The system cross-references the items (nouns) with other database(s) of descriptors (verbs). Descriptors can also be attributes. The users themselves create the items and descriptors, assuming they don't already exist in the system (these initially can be from common lists of items and descriptors, but then enhanced by the users themselves). Items can be anything definable such as products, services, information, service manuals, brochures, warranty information. Descriptors can also be anything definable including (but not limited to), owner, cost to replace, time/milestones (e.g., time to amortize, run times, time between failure), price to buy (e.g., how much would you pay to have this item), price to sell (e.g., alternatively how much would you accept to part with it), location, preferences, color, size, mass, material, number of components, component types, technology used, product manuals, service manuals, manufacture date, warranty information, intended use, expected life, descriptions based on perspectives (e.g., when to buy/sell), usage, places, conditions (e.g., weather, crime, traffic, employment opportunities, educational facilities, natural disasters, war, fighting, health) and so on. Transactions or actions can themselves be attributes and attributes can themselves include any number of attributes or sub-attributes. For example: there can be an attribute called "for sale" which can have the entries "yes', "no", or have a preset "reserve". Whenever a user enters a new item into the system, it first requests descriptor information made common by the system (e.g., by previous users and known databases of items/descriptors (e.g., colors)) but asks the user to enter (or highlight) any new descriptor they deem important to further describe the item. Once one user has entered a new common descriptor, the descriptor is pushed to all previous users with the same item—the system will ask all users of similar items previously entered into the system the same question, typically answerable with a simple yes/no single button response, even if much time has passed from when the similar item was originally input.

Most items can be valued. For example, items of interest could be segmented by price (e.g., how much would you pay to have this item of interest or alternatively how much would you accept to part with an item and so on. Prices would be elective, meaning the user could choose whether to publish any descriptor or not. Buyers would do the same).

Self Learning Examples:

User 1 puts his automobile in the database as a make "Ford". Assume this is the first automobile of any kind in the system. After any amount of time, User 2 puts his automobile into the system also as make "Ford" but with the new descriptor color "black". The system then parses the new entry for descriptor to realize the new descriptor is for color and then automatically asks User 1 the color of his Ford. User 1 can enter the color name (e.g., silver) thereby automatically creating a second list item in the color database or can chose from colors already in the system—again with a simple selection menu (usable on a cell phone). In this manner, for every item in the system and every new descriptor automatically updates the descriptors of all previously added items and creates a list of common descriptors for future item additions to the system. The items and descriptors are "normalized" (to eliminate data redundancy in each language and to translate from one language to another) by referencing external databases and from the system's own users and databases.

Another example would be where one or many persons enter into the system that they own an automobile, but provide no additional information. The first user to enter a manufacturer (e.g., "Audi") creates a system entry for the descriptor "manufacturer." This causes the system to ask all previous users who have entered automobiles to input their automobile manufacturer. Another unrelated user who also owns an Audi automobile enters the new descriptors into the database of model "S4", color "white" and year "1992". The new descriptor entries of "model", "color", and "year" input by the unrelated user then automatically create new descriptor entries in the database. In this manner, the database entries are updated by the users and new descriptors are also created by the users. Further, once a new descriptor is created, the system then goes automatically back to ask all users who own automobiles of all manufacturers, including Audi, their automobile model, color, and year. This is typically done using a very simple "one touch" menu selection on a cell phone or other device. In this manner, the system asks and gathers information based on user input/request. In this way, the system becomes self learning, self propagating, and self enhancing.

Anyone that then showed interest in Audi S4s could become part of a community of Audi S4 consumers/enthusiasts, which the system could also build automatically by its own set of user defined descriptors (e.g., region, language, country, year, model, etc.) In this manner, any individual, group, and/or community of people, items, descriptors could be created automatically and all could be part of a system of real-time buyers and sellers.

In all cases, the system can then initiate the creation of any user community (e.g., Ford or Audi communities, with the obvious ability to create any subset community based on any set of items and/or descriptors (e.g., regions, models, years, etc.) Note that a user may enter data such as NEW CAR, or NEW WATCH. It is possible that the system already knows, from another transaction (perhaps when the user bought the insurance or additional warranty, or optional feature), the attributes of the new car. In such a situation, the already known data is used to populate the database into which the user is now entering his/her new car data. Thus, for example, the user inputs New Car. The system then returns information such as, "Is this new car the Chevrolet purchased on Friday?" The user inputs "YES". The system then for example, returns, "Okay, we have all the data we require at this point. Thank You" or "We have the following data . . . would you like to add more?"

Now assume User B wants a transaction pertaining to Brand M watches. In the context of the invention, a transaction can be anything involving the watch, such as purchase, sale, information, maintenance, parts, dealers, manufacturers, etc. In the example, assume a user desires to buy a used Brand M watch and so informs the system. The system then will communicate with other users who have a Brand M watch and ask them if they want to sell the watch. If the potential consumer had set a price then the price would be displayed for all users who have a Brand M watch (in another embodiment the user who already owns a Brand M watch can include in their profile that they do not want to sell the watch in which case the system would not ask to sell their watch and/or, for example, display a price.)

A sale alert is also possible. The seller could set the attribute that his watch is for sale with a price that would be pushed to all other people with concern/enthusiasm in a similar/same watch (e.g., a person who may be financially distressed and who needs to raise cash quickly, as mentioned above). The instruction to sell would preferably come from the seller's own previously input attribute list (e.g., price attribute), but could also be input into the database by a password-protected, ad-hoc entry. The ad-hoc entry would be tagged to an item and an owner with whatever attributes they want, thereby creating an inventory item that can then be tracked and linked to new buyers and sellers (no longer ad-hoc). A seller who tags any item in his inventory as being for sale could then automatically (in virtually real-time) initiate the sale or start an auction if there is more than one potential buyer. All actions could be automated so that the bidding response can be done with a single button push or by voice like inputs 1102, 1101, 1104. This would create the world's first real-time auction and storefront because it elicits responses from known interested buyers the instant the item is for sale. The opposite is also true; the system elicits responses from known interested sellers the instant any potential buyer makes a purchase request from within the system. The communication with the user would be preferably via cell phone, but could be in any other manner.

Assume now that User A only wanted to buy a Brand M watch having a particular attribute, such as model, year, etc. And assume that not everyone (or no one) had thought to put the attribute into the system. In such a situation, the database would attempt to become populated with the specific details of that particular attribute. This secondary population could be simply by asking each user to supply the attribute, but it could also go to other places, such as manufacturer's records, certain web sites, public records, etc., to obtain the necessary attribute information.

Figure 2:
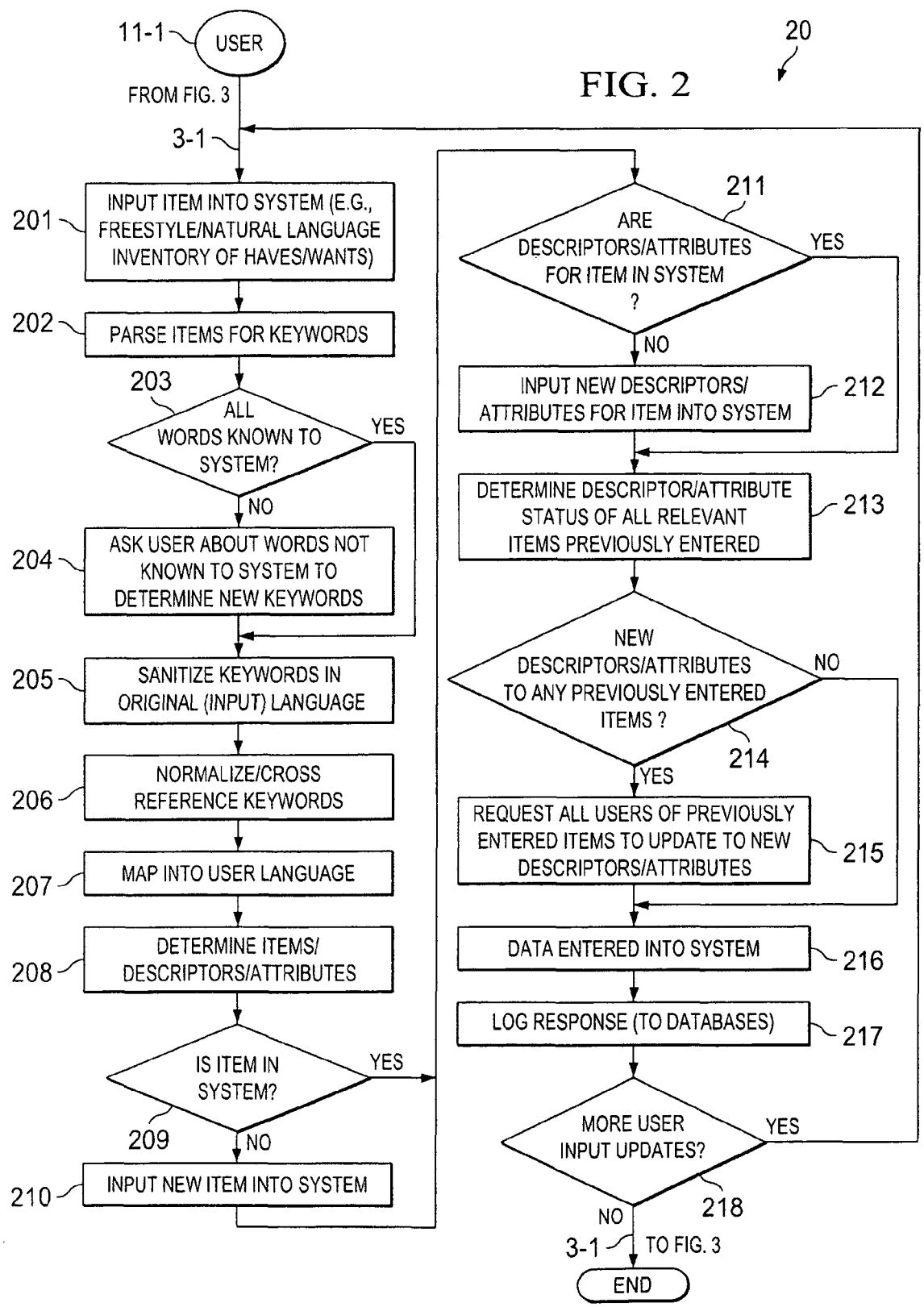
FIG. 2 shows one embodiment of a flow chart of how data is input into the system of the present invention.

FIG. 2 shows one embodiment 20 of a flow chart of how at least some data is input into the system of the present invention. Embodiment 20 can be controlled, for example, by one or more processors (such as processor 1301) either from one server or from multiple servers across the system. Data can be input into one or more servers from any number of sources. These sources of input information can be as diversified as directly from a user by having the user on the system as a visitor (no login required); or under log-in control; or from the user by mere fact of what the user is doing, or what the user has done or has ordered; from a supplier to the user; from a person who is in an electronic relationship (such as a friends list on a web service); from point of sale systems; from warranty systems; from access control systems; from online user profiles/preferences; or from any other parse-able source.

FIG. 2 deals with data coming directly from a particular user. In such a situation, process 201 receives the input item from the user or on behalf of the user. If a log-in and user identity is required then processes 202 and 203 handle this function in the normal manner.

Process 202 parses the input for keywords, for example, by using pre-defined dictionaries, which can be established using reference material as well as "learned" words from both the data being inputted as well as from external sources.

Process 203 determines if all of the input words are known to the system and if not, process 204 works interactively with the input user to determine new keywords and their meaning. Process 205 then sanitizes the keywords in the new input. This then allows the system to perform "natural language" parsing of any input into the system. For example: a user could input a freeform sentence (from another database or form, via keyboard, via speech-to-text functions on a phone, etc.) that then becomes parsed to determine the items and the attributes. Regularly known items and attributes can be pulled from the system and from other obvious databases/dictionaries of times/attributes. The system reconfirms the items and attributes before performing a check that these items' attributes can be translated into other languages. The system will track all items/attributes in the language they were originally input, but can translate instantly into the language of the user (if desired) via cross-referencing "look-up tables." This will allow the system to "learn" across multiple languages and regions—ultimately making it easiest to serve detailed local content on a global scale, as will be discussed below.

Process 206 normalizes and cross-references the keywords in the user's native language while process 207 does the same thing in multi-languages so that the system can be used worldwide. In some situations, it may be desirable to use only certain "base" languages, such as English, German, French, possibly Chinese. In that situation, all keywords would refer to the base language(s).

Process 208 determines items, descriptors and attributes.

Processes 209 and 211 determine if the new item and descriptors are already in the system. If not, processes 210 and 212 enter them in one or more databases as appropriate. If the system had positive, negative and null attribute lists, process 211 could also check the new attributes (with or without their rankings) against these lists to ensure that they are wanted or needed. Process 213 then determines if the new descriptors bear a relationship to existing descriptors such that it is desirable to update the existing descriptors for existing data items in the various worldwide databases. One example would be that a user desires to sell a radio that fits model 23 Brand B truck with navigation. Suppose it is determined that users have heretofore not populated the database with radio information nor with navigation information for their Brand B trucks. In such a situation, the system would determine all such users and push a message to them asking them to check a box (add an attribute) if they have a radio in their Brand B truck and another box if they have navigation. The responses from the various users would then be stored in association with the respective users.

Typically, the messages to users asking for updated information are designed to not burden the user with a lot of typing or other response time. Thus, ideally, the messages would be formatted, when practical, to allow the user to simply answer YES or NO or check an appropriate set of boxes. The answers could be verbal, particularly when the preferred device is a cell phone. Also, if desired, the update messages (or all messages) could be set to arrive at a user's device only during certain periods of time. Thus, a user may instruct the system to only send messages during a particular time period except perhaps for certain messages which could come at other time periods. Process 210 and/or process 214 would control such timing.

In most situations, updating attributes and descriptions is not a time critical operation so this function can be performed under control of process 217 on a "as bandwidth allows" basis. However, in situations in which time is critical, the process of having users update their records can be speeded up by setting one or more priorities. Process 216 then enters the new data in one of more databases as required.

Figure 3:
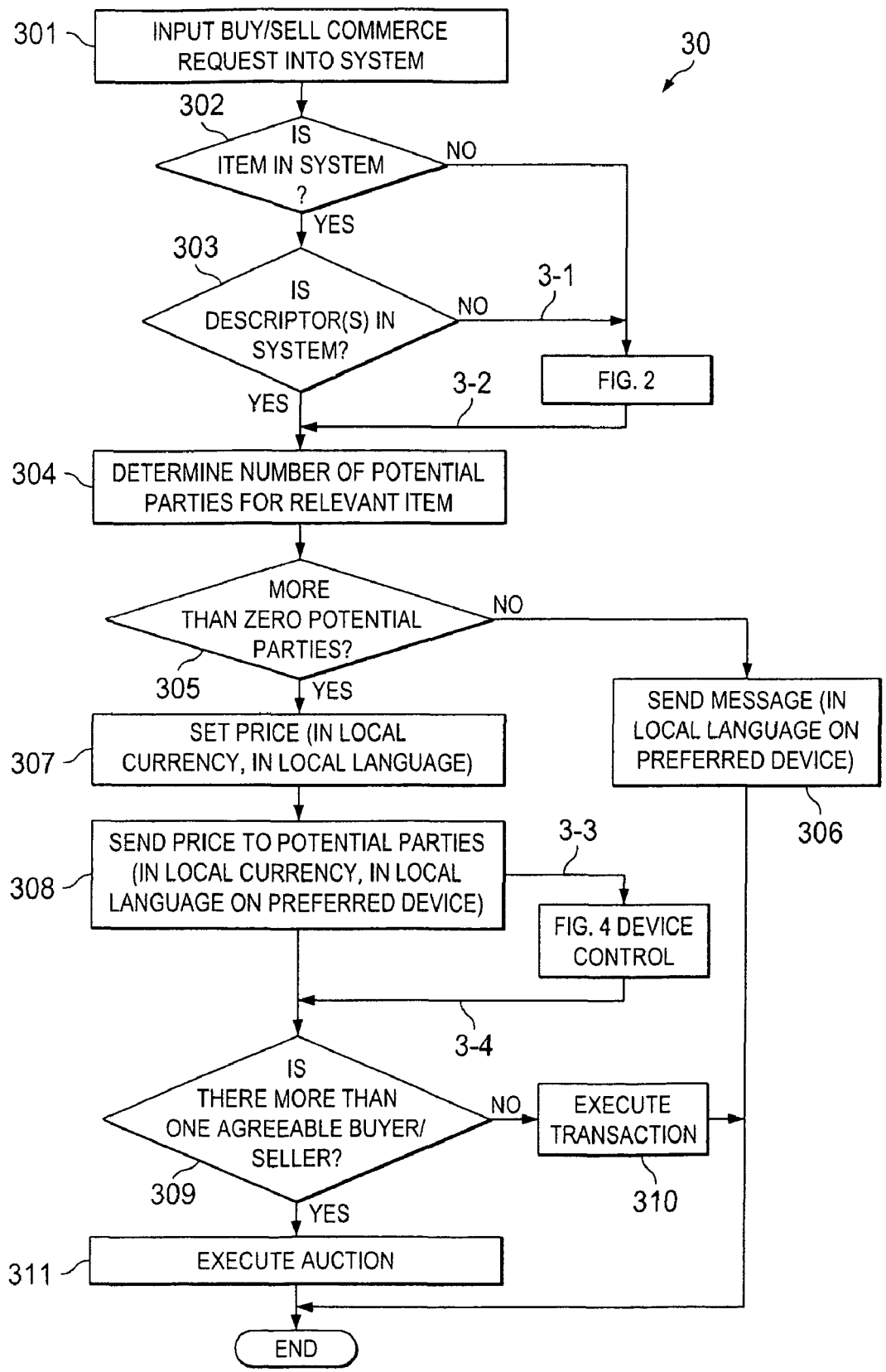
FIGS. 3 and 4 show one embodiment of a flow chart of how a commerce subsystem may interact between users and the system.

In the situation where the data being input is to be used to perform an action, such as BUY, SELL, TRADE, etc., then process 30, FIG. 3 takes command.

Figure 4:
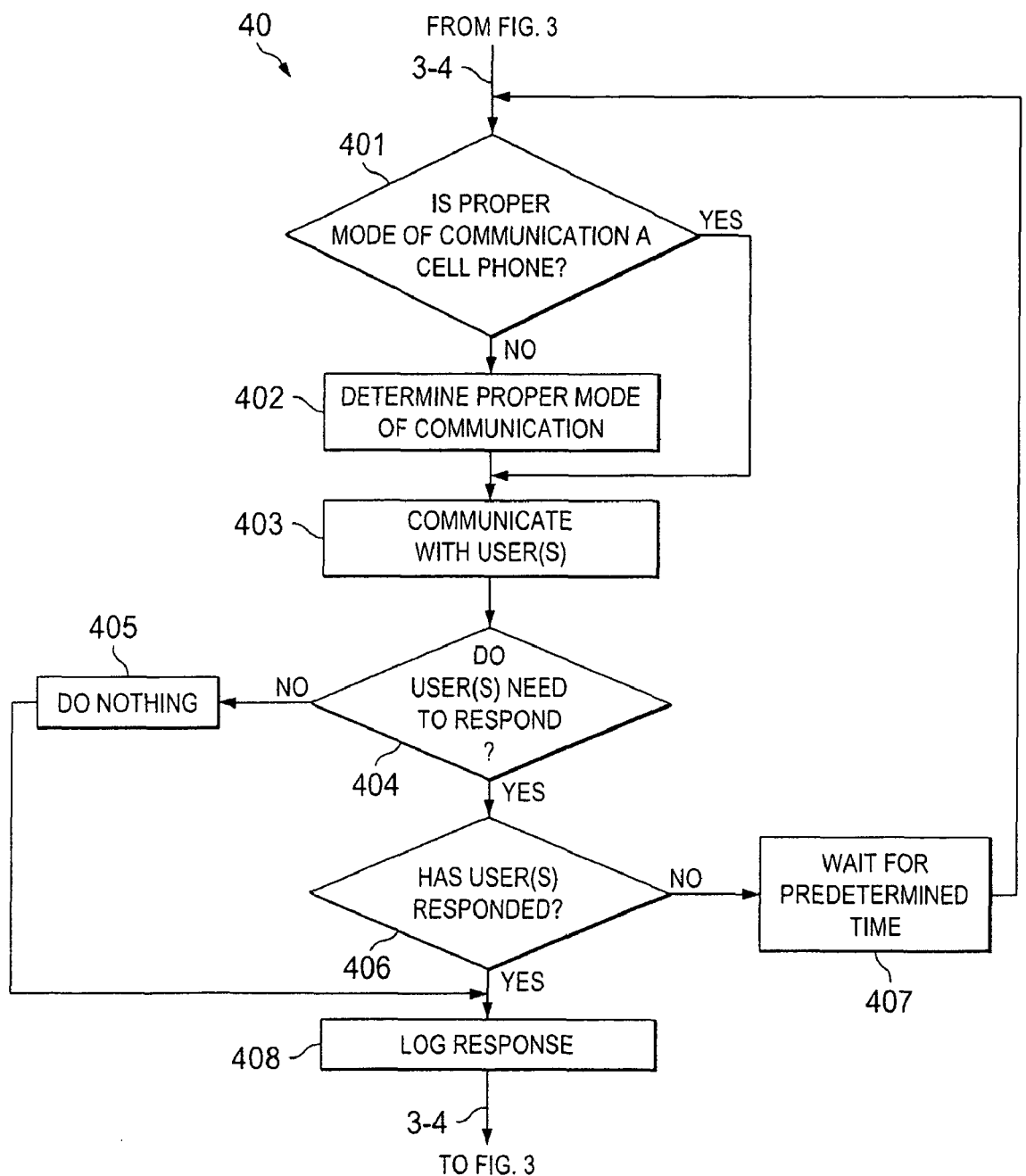

FIGS. 3 and 4 show one embodiment of flow charts 30 and 40 of how a commerce subsystem may interact between users and the system. The system can handle any number of functions of which flow charts 30 and 40 are but one example and are included herein by way of illustration only. The function described in FIG. 3 pertains to new information that triggers a buy or sell notification to other users.

Process 301 (which can be one process at many locations or many at one location) determines that some trigger has occurred somewhere in the system and takes whatever steps necessary to accept input related to the new transaction. This input could be, for example, voice or typed data from a device, such as from a cell phone. One way to accomplish this task is for the user to change (or have changed on the user's behalf) one or more attributes associated with an item. Thus, if the user desired to sell a watch that was already listed in the database, then the user simply would enter a SELL attribute. Processes 302 and 303 determine if the item and the description of the item already reside in the system. If not, then process 20, FIG. 2 is entered and the missing information about the item is obtained from the system.

When all the information pertaining to the item is entered, the current transaction process 304 determines how many potential users exist in the system and are interested in the transaction. In the example, if the current transaction is a sell transaction then the system determines all those users in the database that have bought watches having attributes close to the attributes of the watch that is for sale. In this situation, "close to" can be fixed by the system or can be available to the user to change and could be variable depending upon the type of transaction. The system can then use the "don't wants", if any, to bypass those who would otherwise fall within the selected (target) criteria.

Assume the user wanted to purchase a Brand M watch with a leather band. Process 303, perhaps by accessing one or more databases of such watches or one or more databases where such watches are linked to current watch owners, determines that the year of manufacture is critical as is model number. When such additional information is required it (or at least a part of the required additional information) is available from a database, perhaps in association with the potential buyer or perhaps from the manufacturer, etc. If still more information is desired it may need to come from the seller or even from potential purchasers. If so, the posting user is queried about those items by presenting them as options to select by the posting user.

Processes 305, in conjunction with process 306, informs the user when there are no potential parties to the transaction. This then allows the user to withdraw or change the attributes of the item under consideration.

Process 307 sets the selling price for a sell attribute (or the purchase price for a purchase attribute) and this is done initially in the currency of the seller and in the language of the seller and then can be translated into the currency and language of each potential buyer, if desired.

Process 308, under at least partial control of process 40, FIG. 4, sends the price to all potential parties using the local currency, language and preferred device of each potential target. In some situations, it might be desirable to give some potential targets priority, for example, a 24 hour lead on being notified. This priority can be based on any criteria, such as frequency of use, user status, previous communications, recent transactions, etc.

Process 309 determines if there is more than one positive response and, if so, process 311 sets up an auction using any one of the well-known auction processes. If only one positive result occurs then process 310 executes the transaction. If desired, processes 310 and 311 can operate so that each party can work in his/her own language and currency and the system will translate between the parties. Note that some attributes might be set up so that the first to say YES gets the item and the attribute itself can control how long the item remains open and in situations where the highest price takes it (and not a set fixed price), the attribute can include a minimum below which the item is removed from further commerce.

FIG. 4 shows embodiment 40 of a flow chart of one interactive operation, namely, communicating between the system and a user. Process 401 determines if the proper mode of communication is the user's cell phone. If not, process 402 determines the proper mode of communication with the user. Note that the system may communicate with a user in a variety of ways, which can vary depending on data type, subject, time, location, etc.

Once the proper mode of communication is determined, process 403 sends the proper message to the user, for example to device 11-1 for display on screen 1101. The message can be sent, for example, using SMS messaging or over the normal communication channel. The message can pop-up on the display or could be stored waiting from a trigger from the user, perhaps in response to a prompt indicating that a message from the system is available. As discussed above, preferably these messages are in the form that require easy answers by the user. Thus, instead of saying, "Which model do you prefer?" the message would say, "Press 1 (or speak YES) if you desire model XYZ." Or the message could say, "Press (or say) 1 for model XYZ, press 2 for model ABC, press 3 for model YYY, etc." This then makes it easier to use in mobile situations.

Once the proper mode of communication is established, process 403 allows the system to communicate with the user. Once communication has been sent to the user, process 404 determines if the user needs to respond. If not, the system does nothing in process 405 and process 408 logs the user's response.

If the user does need to respond as determined by process 404, process 406 determines if the user has responded back yet. If not, process 407 waits a predetermined time and then restarts the entire process 40 again from the beginning. Process 407 could also be used to check user location, for example, if they had not moved for a long period of time, for surveillance, or if a parent wanted to check on a child. If the user has responded as determined by process 406, the response is logged by process 408.

Process 404 determines when the user has responded and process 405 determines if the response is positive, i.e., did the user indicate acceptance of the presented option. Note that if the question is more complex, then process 405 would be designed to process all possible user responses, which can be by voice recognition, key sequence detection and the like.

Figure 5:
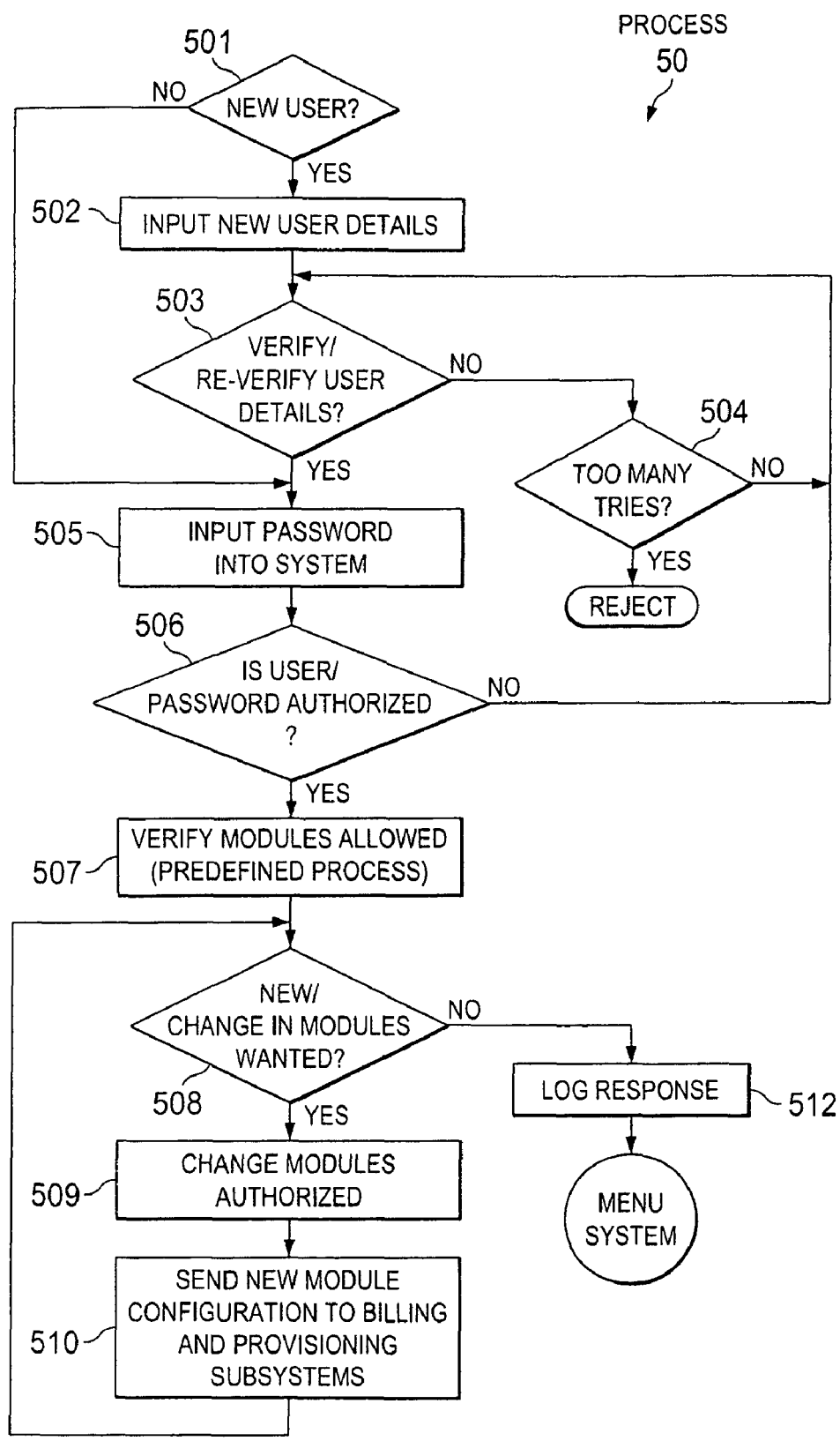
FIG. 5 shows one embodiment of a flow chart showing the login and registration processes of the system.

FIG. 5 shows one embodiment 50 of a flow chart of how a user logs-in and registers in the system. Embodiment 50 would be the first process run each time a user needed to access the system. Process 501 queries the user to determine if they are new to the system. If the user is new, process 502 and 503 would take the new user details and verify them to ensure accurate information, respectively. If the user is unsuccessful in registering by exceeding the allotted amount of attempts, the user is rejected by process 504. If the new user is accepted by process 503, or it is a returning user from process 501, the user is asked to input his password into the system by process 505. Process 506 checks the system to make sure the password is authorized, and if the password is correct, process 507 verifies the modules that are available to that particular user. However, if the user's password is not authorized, the user is again prompted by process 505 to enter a correct password.

Once the modules available to the user are displayed, process 508 allows the user to request a modification or change to those available to him. This could be done by the user himself, or it could be done by the system based on permissions. If the changes in modules are allowed, process 509 authorizes the changes and process 510 sends new module configurations to the billing and provisioning subsystems. The user can again request changes to the modules available until he has the modules he requires. When no more changes are required, process 512 logs the user's response and enters it into the system.

FIG. 6 shows an embodiment of process 60, which is a decision made by the system based on the user's response to a question. Process 601 determines if the user's response is positive. If so, it performs positive action process 602 and then logs the user's response by process 607.

If the user's response is not positive, process 603 determines if the user's response is negative. If it is negative, negative action process 604 is performed and then the user's response is logged via process 607.

If the user's response is not positive or negative, process 605 determines if the user's response is other. If it is other, the other action is performed by process 606 and the user's response is logged via process 607.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer controlled method for interaction among a plurality of independent users, said method comprising:
    accepting information from a plurality of said users pertaining to one or more items associated individually with each said user; said information for each item having attributes and actions associated with that item, said information accepted into one or more databases;
    determining user communities among said users, said user communities centered about accepted ones of said items, said determining accomplished under processor control based, at least in part, on said item attributes;
    determining from accepted information pertaining to an item for a particular user that an attribute is missing from other accepted items regardless of which database said other accepted item is stored; and
    obtaining said missing attributes for all other items in any of said databases.

2. The method of claim 1 further comprising sending an action oriented message to users in a particular determined user community notifying said users in said user community of a pending action that can be taken with respect to a particular item, said sending triggered at least in part, by said item actions.

3. The method of claim 2 wherein said action oriented message comprises:
    one or more queries as to an action a message recipient user might wish to take with respect to a specific item previously accepted into one of said databases.

4. The method of claim 3 wherein said query allows said recipient user to perform one of said item actions with respect to said specific item.

5. The method of claim 3 wherein said queries present a recipient user a menu choice for response.

6. The method of claim 3 wherein said query comprises at least one of the following:
    selling price, offering price, bid price, reserve price, instant sale price.

7. The method of claim 2 wherein said action oriented message is sent to users on said user's respective mobile devices.

8. The method of claim 1 wherein said attributes comprise at least one of the following: owner, level of want, level of need, level of interest, cost to replace, amortizations, price to acquire (buy), price to dispose (sell), location, preferences, model, cost, color, size, mass, material, number of components, component types, technology used, time, product manuals, service manuals, manufacture date, warranty information, run times, intended use, time between failure, expected life, maintenance schedule.

9. The method of claim 1 wherein said actions comprise at least one of the following: offer to sell, offer to buy, sold, auction.

10. The method of claim 9 wherein said buy/sell attributes of a particular item trigger a transaction among users defined by attributes of said particular item.

11. The method of claim 9 wherein said auction actions of a particular item trigger an auction among users in a user community defined by attributes of said particular item.

12. The method of claim 1 wherein said obtaining comprises:
    requesting users associated with said accepted items to provide said missing attribute.

13. The method of claim 1 wherein said obtaining comprises:
    requesting third parties known to have information pertaining to said missing attributes to supply said missing information.

14. The method of claim 1 wherein said user community comprises:
    one or more users associated with a same or similar item, attribute, or action.

* * * * *